(12) United States Patent
Baldwin et al.

(10) Patent No.: US 9,029,715 B1
(45) Date of Patent: May 12, 2015

(54) UNIVERSAL CONDUIT BODY ASSEMBLY

(75) Inventors: Jeffrey P. Baldwin, Phoenix, AZ (US);
Edgar W. Maltby, Mesa, AZ (US);
Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 179 days.

(21) Appl. No.: 13/585,691

(22) Filed: Aug. 14, 2012

Related U.S. Application Data (63) Continuation of application No. 12/512,879, filed on Jul. 30, 2009, now Pat. No. 8,242,386.

(60) Provisional application No. 61/084,970, filed on Jul. 30, 2008.

(51) Int. Cl.
*H02G 3/08* (2006.01)
*H01H 9/02* (2006.01)
*H02B 1/40* (2006.01)

(52) U.S. Cl.
CPC .. *H02G 3/08* (2013.01); *H01H 9/02* (2013.01); *H02G 3/081* (2013.01); *H02B 1/40* (2013.01)

(58) Field of Classification Search
CPC ........... H02G 3/08; H02G 3/081; H02G 3/18; H02G 3/185; H02G 3/28; H02G 15/06; H02G 15/08; H02G 3/36; H02G 3/38; H02G 3/105; H01H 9/02; H05K 5/00; H02B 1/40
USPC ......... 174/480, 481, 50, 53, 57, 58, 520, 563, 174/59, 60, 64, 67, 559, 66; 220/3.2–3.9, 220/4.02, 241, 242; D13/152
See application file for complete search history.

(56) References Cited

U.S. PATENT DOCUMENTS

| | | | |
|---|---|---|---|
| 2,861,705 A | 11/1958 | Scott | |
| 3,844,440 A | 10/1974 | Hadfield et al. | |
| 4,936,478 A | 6/1990 | Bozdeck | |
| 6,527,302 B1 | 3/2003 | Gault et al. | |
| 7,259,337 B1 | 8/2007 | Gretz | |
| 7,446,266 B1 | 11/2008 | Gretz | |
| 7,504,580 B2 | 3/2009 | Lammens et al. | |
| 7,939,767 B2 | 5/2011 | Tiefenthaler | |
| D686,995 S * | 7/2013 | Nikayin | D13/152 |

* cited by examiner

*Primary Examiner* — Angel R Estrada
(74) *Attorney, Agent, or Firm* — Roylance, Abrams, Berdo & Goodman, L.L.P.

(57) ABSTRACT

In an aspect, a universal conduit body assembly comprises a universal conduit body having a first port attached thereto. The first port is sized and shaped to connect the conduit body with one or more conduits or plugs. A cavity is at least partially defined by the conduit body, and the cavity comprises at least two open sides and sufficient space for containment of one or more spliced wires within the conduit body. Two or more removable panels each sized and shaped to cover a portion of the universal conduit body and selectively attach to each of the at least two open sides of the cavity are provided. At least one of the two or more panels includes a second port sized and shaped to connect the panel with the one or more conduits or plugs.

13 Claims, 6 Drawing Sheets

UNIVERSAL CONDUIT BODY ASSEMBLY

CROSS REFERENCE TO RELATED APPLICATIONS

This application is a continuation of the earlier patent application entitled "Universal Conduit Body Assembly," Ser. No. 12/512,879 to Baldwin et al., filed Jul. 30, 2009, now pending, which claims the benefit of priority to U.S. provisional application Ser. No. 61/084,970 to Baldwin et al., entitled "Universal Conduit Body," filed Jul. 30, 2009, the disclosures of which are hereby incorporated herein by reference.

BACKGROUND

1. Technical Field

Aspects of the present document relate generally to conduit bodies and more specifically to conduit bodies having adapters capable of connecting multiple conduits.

2. Background Art

Conduit bodies are commonly used to connect two or more conduits together. Conduit bodies are useful in that, among other things, they may form a convenient place where wires from different conduits may be spliced together.

SUMMARY

Aspects of this document relate to conduit bodies.

In one aspect, a universal conduit body assembly comprises a universal conduit body having a first port attached thereto. The first port is sized and shaped to connect the conduit body with one or more conduits or plugs. A cavity is at least partially defined by the conduit body, and the cavity comprises at least two open sides and sufficient space for containment of one or more spliced wires within the conduit body. Also included are two or more removable panels each sized and shaped to cover a portion of the universal conduit body and selectively attach to each of the at least two open sides of the cavity, at least one of the two or more panels comprising a second port sized and shaped to connect the panel with the one or more conduits or plugs.

Particular implementations may include one or more of the following. At least one of the two or more panels may be selectively attached to the universal conduit body via one or more hinge members. At least one of the two or more panels may be biased to the closed position. At least one of the two or more panels may be selectively attached to the universal conduit body via one or more panel connectors. The second port may be fixedly attached at least one of the two or more panels. The second port may be selectively attached at least one of the two or more panels. A second port gasket may be interposed between the second port and at least one of the two or more panels. A panel gasket may be interposed between at least one of the two or more panels and the conduit body. The second port may comprise a setter screw. A first port gasket may be interposed between a first port and the universal conduit body.

In another aspect, a universal conduit body assembly comprises a universal conduit body having a first port fixedly attached thereto. The first port is sized and shaped to connect the conduit body with one or more conduits or plugs. A cavity is at least partially defined by the conduit body, and the cavity comprises at least two open sides and sufficient space for containment of one or more spliced wires. Two or more panels are each sized and shaped to at least partially mate with the universal conduit body and selectively attach to each of the at least two open sides of the cavity so as to form at least a partial seal between the panel and the conduit body. At least one of the two or more panels comprises a second port fixedly attached thereto, and the second port is sized and shaped to connect the panel with one or more conduits or plugs. Also, the at least two panels are moveable between an open position and a closed position with respect to the universal conduit body. The at least two panels allow substantial access to the at least partially defined cavity when one or more of the at least two panels are in the open position.

Particular implementations may include one or more of the following. At least one of the two or more panels may be selectively attached to the conduit body via one or more hinge members. At least one of the two or more panels may be biased to the closed position. At least one of the two or more panels may be selectively attached to the conduit body via one or more panel connectors. A panel gasket may be interposed between at least one of the two or more panels and the conduit body. One of the first port and the second port may be covered by one or more plugs when not in use.

In still another aspect, a method of connecting two or more conduits comprises connecting a first conduit to a first port of a universal conduit body and connecting a second conduit to a second port of at least one of the two or more panels. The method further includes splicing together one or more wires from the first conduit with one or more wires of the second conduit inside a cavity defined by the universal conduit body such that the one or more spliced wires are contained within the cavity. The method yet further includes selectively attaching two or more panels to at least two open sides of the cavity so as to form at least a partial seal between the two or more panels and the conduit body.

Particular implementations may include one or more of the following. Connecting a second conduit to a second port of at least one of the two or more panels may comprise connecting each of two or more second conduits to a second port of at least two of the two or more panels. Selectively attaching the two or more panels to at least two open sides of the cavity may comprise attaching at least one of the two or more panels to the conduit body via one or more hinge members. Selectively attaching the two or more panels to at least two open sides of the cavity may comprise attaching at least one of the two or more panels to the conduit body via one or more panel connectors.

The foregoing and other aspects, features, and advantages will be apparent to those having ordinary skill in the art from the DESCRIPTION and DRAWINGS, and from the CLAIMS.

BRIEF DESCRIPTION OF THE DRAWINGS

A universal conduit body assembly will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of a universal conduit body assembly and/or assembly procedures for a universal conduit body assembly will become apparent from this disclosure. Accordingly, for example, although particular universal conduit bodies, first ports, conduits, plugs, cavities, open sides, panels, second ports, partial seals, hinge members, panel connectors, first port gaskets, second port gaskets, panel gaskets, setter screws, and other components are disclosed, such universal conduit bodies, first ports, conduits, plugs, cavities, open sides, panels, second ports, partial seals, hinge members, panel connectors, first port gaskets, second port gaskets, panel gaskets, setter screws, and implementing components, may comprise any shape, size, style, type, model, version, measurement, concentration, material, quantity, and/or the like as is known in the art for such universal conduit body assemblies, consistent with the intended operation of a universal conduit body assembly.

There are a variety of universal conduit body assembly implementations disclosed herein. FIGS. 1-4 illustrate various aspects of a first particular implementation of a universal conduit body assembly, with the associated description explaining this, and other, particular implementations. Universal conduit body adapter assembly 2 (and other particular implementations of universal conduit body assemblies described herein) is used to connect two or more conduits together. By way of non-limiting example, some types of conduits that may be connected together using a universal conduit body assembly 2 may include: Rigid Metal Conduit (RMC); Rigid Nonmetallic Conduit (RNC); Galvanized Rigid Conduit (GRC); Electrical Metallic Tubing (EMT) (sometimes also called Thin-Wall); Electrical Nonmetallic Tubing (ENT); Flexible Metallic Conduit (FMC); Liquidtight Flexible Metal Conduit (LFMC); Flexible Metallic Tubing (FMT); Liquidtight Flexible Nonmetallic Conduit (LNFC) (also sometimes abbreviated as FNMC); Aluminum Conduit; Intermediate Metal Conduit (IMC); PVC Conduit; Other Metal Conduits; Underground Conduit; Raceway (Wire Molding); and other types of conduits known in the art. Conduits are typically offered in a variety of standard sizes, including, by way of non-limiting example, ½", ¾", and 1".

As shown in FIGS. 1-4, the first particular implementation of universal conduit body assembly 2 comprises a universal conduit body 4. A universal conduit body 4 comprises at least one first port, such as first port 6a and/or first port 6b, that may be either selectively or fixedly attached to the universal conduit body 4. The first ports 6a and 6b are sized and shaped to connect the universal conduit body 4 with one or more conduits (not shown), and may be provided in a variety of sizes to accept and/or connect with standard conduit sizes such as, by way of non-limiting example, ½", ¾", and 1". Once connected, one or more conduits may be held in place with respect to first port 6a and/or the first port 6b via a setter screw 28. Alternatively, the first port 6a and/or the first port 6b may comprise a threaded portion to assist in the connection between the first port 6a and/or the first port 6b and a conduit. Significantly, when one or more first ports 6 are not in use, a plug 7 may be inserted into an unused first port 6 to at least partially seal the first port from debris and the like.

The universal conduit body 4 at least partially defines a cavity 8. The cavity 8 includes sufficient space to contain one or more sets of spliced wires (not shown) for the intended use of the conduit body with electrical wiring. Specifically, the cavity 8 is sized and shaped to accommodate one or more wires from one or more first conduits attached to one or more first ports 6, as well as one or more wires from one or more second conduits attached to one or more second ports (described further below). The cavity 8 may also be configured to allow for the easy splicing of wires therein and/or to make hand and/or tool movement among and/or around the wires and the splicing of them inside the cavity 8, or coupling two sets of wires outside the conduit body and inserting the spliced wires into the cavity 8, easier due to a sufficient amount of space within cavity 8. Those of ordinary skill in the art will readily be able to determine the appropriate amount of space needed for a particular application from the disclosure provided herein. The universal conduit body 4 may also take on large sizes such as to allow the universal conduit body 4 to contain other components alternatively, or in addition to spliced wires, such as fuses, switches, and/or other components.

While the universal conduit body 4 is shown as substantially rectangular, the universal conduit body 4 may comprise any shape. For instance, the universal conduit body 4 may comprise a substantially cuboidal shape with unequal sides or a partially cuboidal and partially cylindrical shape, such as cuboidal along the length and cylindrical near the top and bottom. Although not specifically shown in the figures, the universal conduit body 4 could comprise any other shape such as cubic, entirely cylindrical, semispherical, or any other regular or irregular shape. In addition, the universal conduit body 4 may comprise any size, so long as the at least partially defined cavity 8 provides sufficient space to allow for the containment of one or more spliced wires (and/or other electrical components). As noted above, the universal conduit body 4 may also be configured to allow for the easy splicing of wires.

In any event, the universal conduit body 4 is configured such that the at least two open sides 10 of the cavity 8 are substantially accessible via a panel that may be selectively attached and removed to the universal conduit body 4. While all of the particular implementations of universal conduit body 4 disclosed herein have four sides that allow substantial access to the at least partially defined cavity 8 via selectively attachable panels, the universal conduit body 4 may comprise any other number of sides and/or areas that allow substantial access to the at least partially defined cavity 8 via selectively attachable panels. For instance the universal conduit body 4 may comprise one, two, three, four, five, six, seven, eight, or more sides.

Still referring to FIGS. 1-4, the cavity 8 includes at least two open sides 10. The at least two open sides 10 of the cavity 8 are each covered by a corresponding panel, so that at least two panels are provided with respect to the universal conduit body assembly 2. While various types of panels are possible, with respect to any of the particular embodiments of panels described herein, a panel is sized and shaped to at least partially mate with the universal conduit body 4. As described further below, "mating" a panel with a universal conduit body 4 may involve using one or more panel connectors 22 or one or more hinge members. In an event, two or more panels are selectively attachable (the panels may be attached and/or removed as desired) to the at least two open sides 10 of the cavity 8 so as to form at least a partial seal 20 between each panel and its corresponding open side 10. The partial seal 20 may be formed through the cooperation of a rear surface of a panel (such as rear surface 16a or 16b) with the universal conduit body 4.

Significantly, at least one of the at least two open sides 10 are enclosed with a panel 12b (which, as described below, comprises a second port 18), while the remaining one or more open sides 10 of the cavity 8 may be enclosed by either a panel 12b, a panel 12a, or any other panel disclosed herein or consistent with these disclosures. A panel 12b is selectively attached to at least one open side 10 of the cavity 8 via one or more panel connectors 22 and/or hinge elements (not shown). A panel connector 22 may comprise any screw, bolt, fastener, clip or the like and may selectively mate with one or more panel connector anchors 21. In any event, the panel 12b comprises a front surface 14b, a rear surface 16b, and a second port 18. While the second port 18 of panel 12b is shown offset towards one end of the panel, it will be understood that a second port 18 may be located anywhere along a panel (such as, by way of non-limiting example, in the middle of panel, as on panel 12c in FIG. 5). The second port 18 may be fixedly attached to a panel (e.g. integrally formed, in some particular implementations) or, alternatively, the second port 18 may be selectively attached to a panel (e.g. panel 12a, 12b, or 12c). In those particular implementations where second port 18 is selectively attached to a panel, a second port gasket (not shown) may be included to provide weather and/or debris resistance between the second port 18 and the panel 12b.

In any event, the second port 18 is sized and shaped to connect the universal conduit body 4 with one or more conduits (not shown), and may be provided in a variety of standard port sizes to accept and/or mate with standard conduit sizes such as, by way of non-limiting example, ½", ¾", and 1" conduits. Once connected, one or more conduits may be held in place with respect to one or more second ports 18 via a setter screw 28. Alternatively, the one or more second ports 18 may comprise a threaded portion to assist in the connection between one or more second ports 18 and a conduit. When one or more second ports 18 are not in use, a plug 7 may be inserted into the unused second port 18 to at least partially seal the second port 18 from debris and the like. Notwithstanding, in those particular implementations where the second port 18 is selectively attachable to the panel 12b, the second port 18 may simply be omitted from a panel on which a second port 18 is not desired).

While a panel 12b is shown attached to at least one of the at least two open sides 10 of the cavity 8 in the first particular implementation of universal conduit body assembly 2, the remaining one or more open sides 10 of the cavity 8 may be enclosed by either a panel 12b, a panel 12a, or any other panel disclosed herein or consistent with these disclosures. In contrast to a panel 12b, a panel 12a does not include a second port 18, but rather comprises a front surface 14a, and a rear surface 16a.

With respect to any of the panels described herein, including panel 12a and panel 12b, a panel is selectively attached to each of the at least two open sides 10 of the cavity 8 via one or more panel connectors 22 and/or hinge elements (not shown). All of the panels disclosed herein are likewise positionable between an open position and a closed position. When a panel is in an open position with respect to the universal conduit body 4 (such as panel 12a in FIG. 3), the panel allows substantial access to the cavity 8. Substantial access includes access that may be required to splice one or more wires and/or access to make hand and/or tool movements. By contrast, when a panel is in a closed position with respect to the universal conduit body 4, at least a partial seal 20 is formed between the panel and the universal conduit body 4. It will be understood that the particular positionability between open and closed positions for one or more panels may depend upon the nature of the panel connector 22 or hinge member (not shown) being used.

Where one or more panels comprise one or more panel connectors 22, moving a panel to an open position may comprise first loosening and/or removing one or more panel connectors (with respect to the universal conduit body 4 and/or one or more panel connector anchors 21), and then moving the panel to the open position (which may comprise pivoting or removing a portion, or all, of the panel from the universal conduit body). Accordingly, moving a panel having one or more panel connectors 22 to a closed position may comprise first aligning the panel so that a rear surface of the panel (e.g. rear surface 16a or 16b) is adjacent to the universal conduit body 4. One more panel connectors 22 may thereafter be secured in order to form at least a partial seal 20 between the panel and the universal conduit body 4.

In addition to the foregoing, where one or more panels comprise one or more hinge elements (not shown), a portion of the hinge member may be attached on or near an edge of a panel, while another portion of the hinge member may be attached to the universal conduit body 4. Accordingly, moving a panel having a hinge member to an open position may comprise simply lifting the panel away from the universal conduit body 4. Likewise, moving a panel having a hinge member to a closed position (with respect to the universal conduit body 4) may comprise simply lowering the panel toward from the universal conduit body 4. Significantly, in some particular implementations of panel having a hinge member, the hinge member may include an element to bias the panel to a closed position with respect to the universal conduit body 4.

Figure 1:
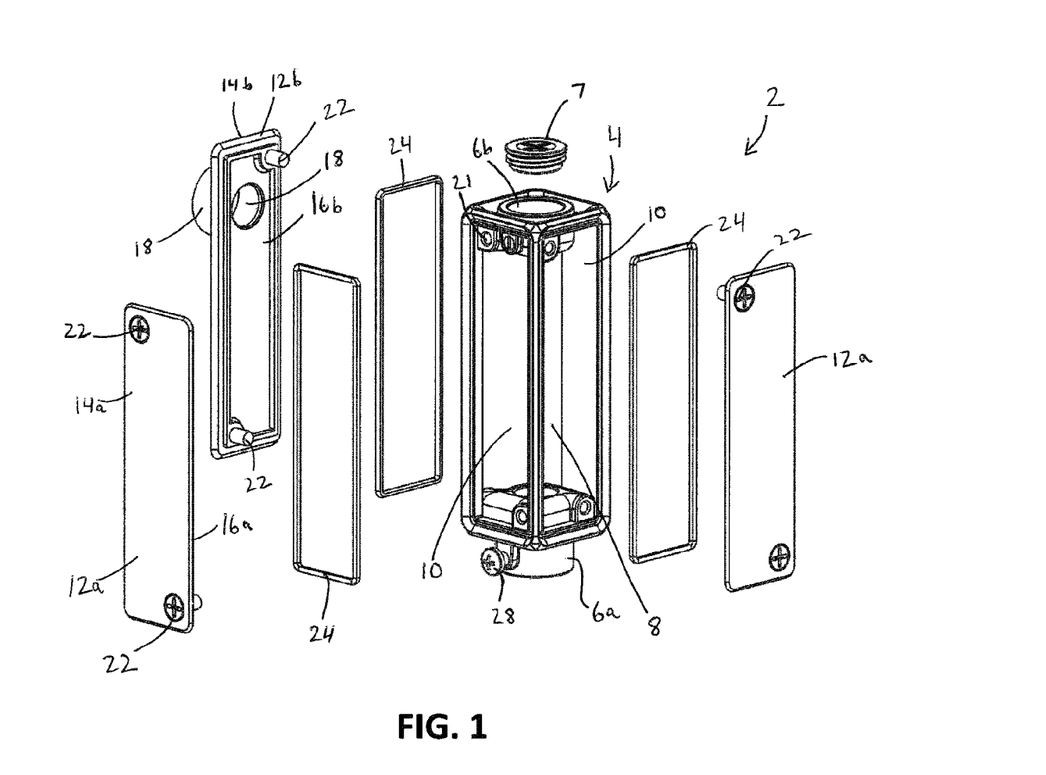
FIG. 1 is an exploded perspective view of a first particular implementation of a universal conduit body assembly.
Figure 2:
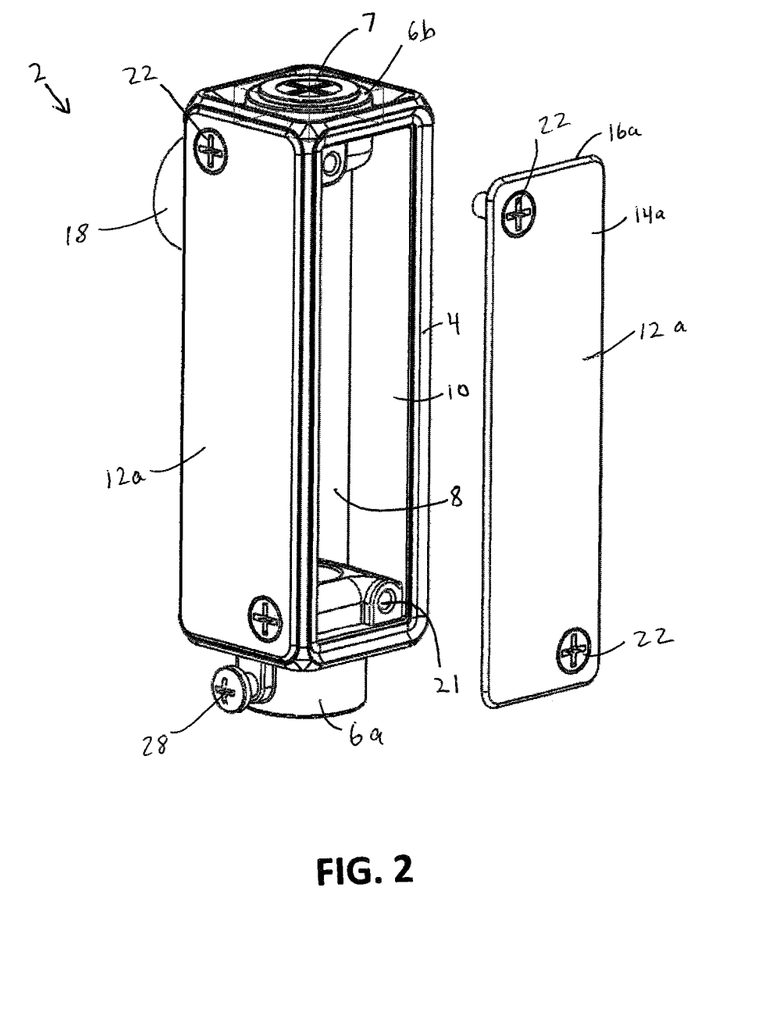
FIG. 2 illustrates a partially assembled perspective view of the device shown in FIG. 1.
Figure 3:
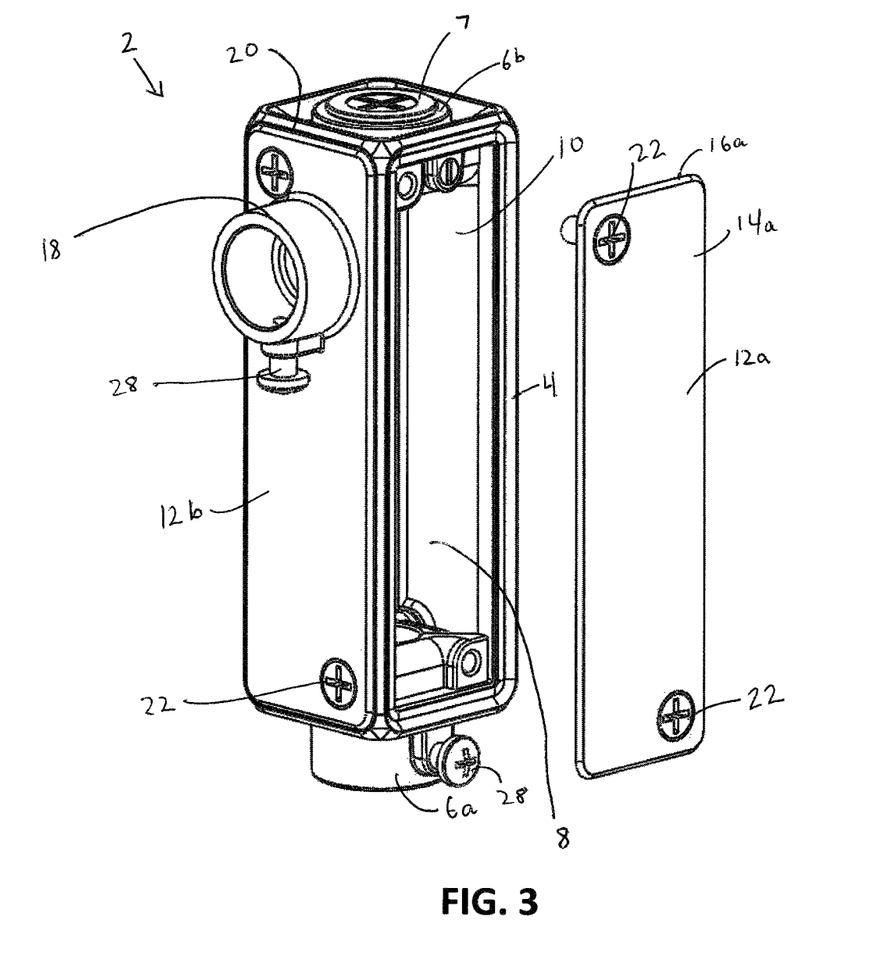
FIG. 3 illustrates a partially assembled alternative perspective view of the device shown in FIGS. 1 and 2.
Figure 4:
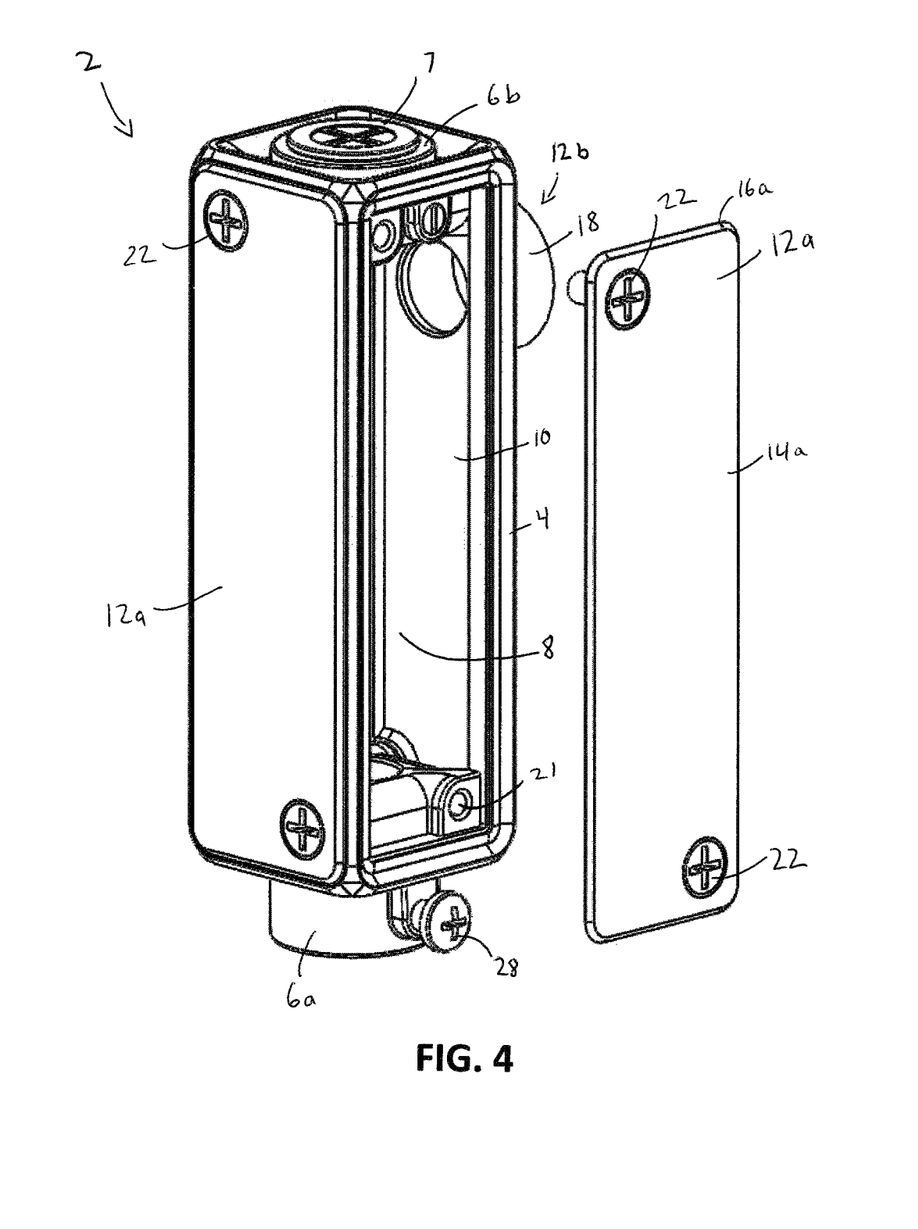
FIG. 4 illustrates a partially assembled perspective view of the device shown in FIGS. 1-3.

With respect to any of the particular implementations of universal conduit body assemblies disclosed herein, it will be understood that one or more panels may be moved (swapped) among the at least two open sides 10 of the universal conduit body 4 to allow for different universal conduit body assembly configurations, according to the needs of a particular application. For instance, a comparison of FIG. 2 to FIG. 3 illustrates that the attached panel 12a (FIG. 2) has been replaced with a panel 12b (FIG. 3). Similarly, a comparison of FIG. 3 to FIG. 4 illustrates that a panel 12b is attached to a different open side 10 in each of the figures. Therefore, it will be understood that by moving one or more panels (such as one or more panels 12b or 12c) from one open side 10 to another open side 10, different configurations of universal conduit body assemblies may be achieved. Accordingly, depending upon the needs of a particular job, a user may connect two or more conduits in a variety of different layouts and/or configurations with respect to a universal conduit body 4, simply by arranging and/or re-arranging one or more panels on one or more open sides 10. Similarly, one or more panels (such as panel 12b or 12c) may be arranged and/or re-arranged with respect to a universal conduit body 4 in order to conform with (and be able to mate with) one or more conduits in an existing configuration.

In addition to the foregoing, a panel gasket 24 may be included in any particular implementation of universal conduit body assembly disclosed herein, the panel gasket 24 being interposed between one or more of the two or more panels and the universal conduit body 4 in order resist weather-elements and/or debris.

Figure 5:
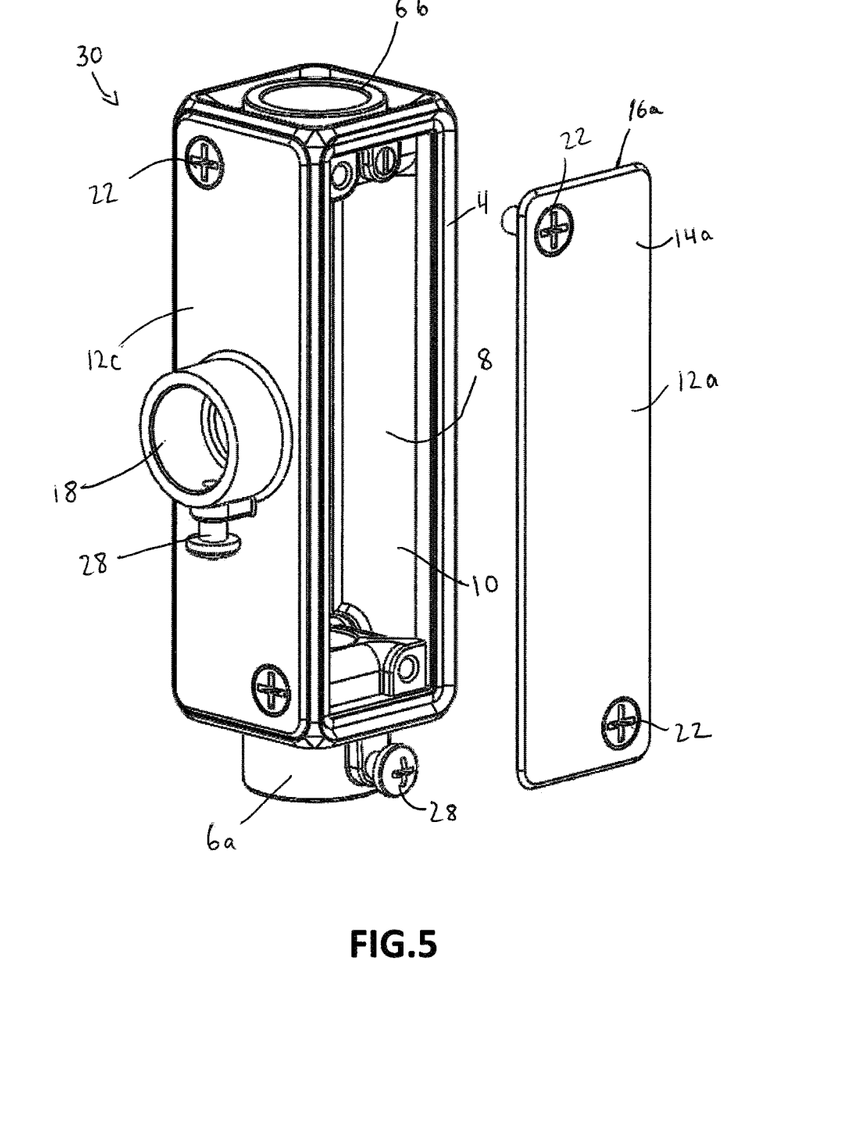
FIG. 5 illustrates a coupled perspective view of a second particular implementation of a universal conduit body assembly.

Turning now to FIG. 5, this figure illustrates a second particular implementation of a universal conduit body assembly 30, showing that different configurations of universal conduit body assemblies may be achieved depending upon the needs of a particular job. For example, the second particular implementation of a universal conduit body assembly 30 differs from the first particular implementation of a universal conduit body assembly 2 principally by the inclusion of panel a 12c. Like panel 12b, panel 12c comprises a second port 18. Nevertheless, a comparison of FIG. 5 to FIG. 2 illustrates that the second port 18 of panel 12c is located substantially in the center of panel 12c, whereas the second port 18 of panel 12b is substantially offset to one end of the panel. Therefore, a user may select an appropriate panel depending upon the particular location and configuration of an existing conduit, or in accordance with a planned conduit layout. For instance, if a conduit runs (or is planned to be run) to a particular open side 10 to a middle of a panel, then a user may select a panel 12c to install on that particular open side 10, since panel 12c comprises a second port 18 substantially in the middle of the panel. Nevertheless, if a conduit runs (or is planned to be run) to a particular open side 10 to an end of a panel, then a user may select a panel 12b to install on that particular open side 10, since panel since 12b comprises a second port 18 substantially at the end of the panel. Of course, additional second port 18 locations and/or configurations may be provided in order to accommodate one or more existing or planned conduit layouts. Notwithstanding the foregoing differences, the second particular implementation of a universal conduit body assembly 30 operates similarly to the first particular implementation of a universal conduit body assembly 2.

Figure 6:
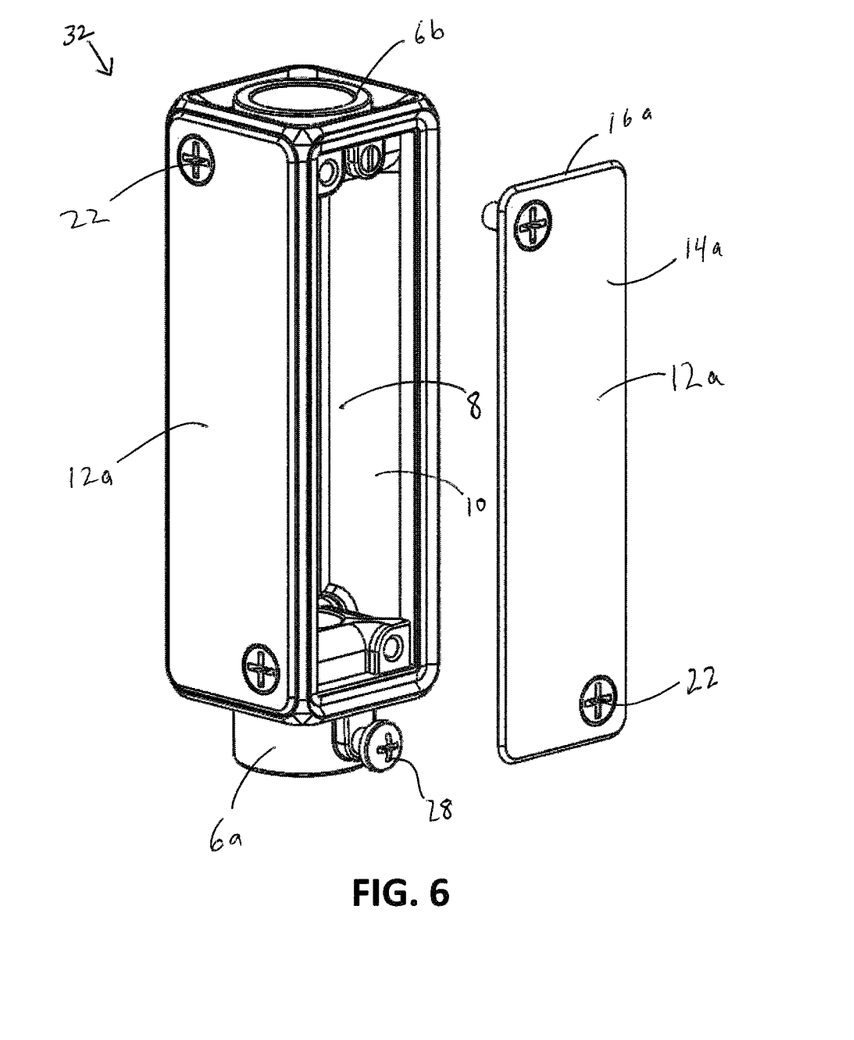
FIG. 6 illustrates a perspective view of a third particular implementation of a universal conduit body assembly.

Turning now to FIG. 6, this figure illustrates a third particular implementation of a universal conduit body assembly 32. As shown in the figure, a universal conduit body assembly 32 may be provided so as to couple two conduits (not shown) in a substantially straight line. For instance, with a first conduit coupled with first port 6a and with a second conduit coupled with first port 6b, it will be understood that the first conduit and the second conduit will be attached in a parallel, end to end configuration (the ends of the conduit mated with the universal conduit body 4 do not touch one another). Therefore, a comparison of the various particular implementations of universal conduit body assemblies herein shows that many different configurations of a universal conduit body assembly are possible, and such assemblies may be arranged and/or re-arranged (at least via the arrangement and/or rearrangement of one or more panels and/or first ports), as needed or desired.

A non-exemplary method of connecting two or more conduits is now described. The method comprises connecting a first conduit to a first port (either first port 6a or 6b, or another first port). The method further comprises connecting a second conduit, different from the first, to a second port 18 of at least one of two or more panels (such as panel 12a, 12b, and/or 12c). The method still further comprises splicing together one or more wires from the first conduit with one or more wires of the second conduit inside the cavity 8 defined by the universal conduit body 4 such that the one or more spliced wires are contained within the cavity 8. The method yet further comprises selectively attaching two or more panels (such as panel 12a, 12b, and/or 12c) to at least two open sides 10 of the cavity 8 so as to form at least a partial seal 20 between the two or more panels and the universal conduit body 4.

The non-exemplary method of connecting two or more conduits described above may further comprise connecting each of two or more second conduits to a second port of at least two of the two or more panels. For instance, at least two of the two or more panels may each comprise a second port 18, and two or more second conduits may each be attached to its own corresponding second port 18 on its respective panel. The method may further include attaching at least one of the two or more panels to the conduit body via one or more hinge members. The method may further include attaching at least one of the two or more panels to the universal conduit body 4 via one or more panel connectors 22.

It will be understood by those of ordinary skill in the art that the concepts of connecting conduits together, as disclosed herein, is not limited to the specific implementations shown herein. For example, it is specifically contemplated that the components included in a particular implementation of a universal conduit body assembly may be formed of any of many different types of materials or combinations that can readily be formed into shaped objects and that are consistent with the intended operation of a universal conduit body assembly. For example, it is specifically contemplated that the components included in a particular implementation of a universal conduit body assembly may be formed of any of many different types of materials or combinations that can readily be formed into shaped objects and that are consistent with the intended operation of a universal conduit body assembly. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the universal conduit body assemblies, universal conduit bodies, first ports, conduits, plugs, cavities, open sides, panels, second ports, partial seals, hinge members, panel connectors, first port gaskets, second port gaskets, panel gaskets, setter screws, and other components are disclosed, such universal conduit bodies, first ports, conduits, plugs, cavities, open sides, panels, second ports, partial seals, hinge members, panel connectors, first port gaskets, second port gaskets, panel gaskets, setter screws, and any other components forming a particular implementation of a the universal conduit body assembly may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations of universal conduit body assemblies are not limited to the specific components disclosed herein, as virtually any components consistent with the intended operation of a method and/or system implementation for a universal conduit body assembly may be utilized. Accordingly, for example, although particular universal conduit bodies, first ports, conduits, plugs, cavities, open sides, panels, second ports, partial seals, hinge members, panel connectors, first port gaskets, second port gaskets, panel gaskets, setter screws, and other components are disclosed, such universal conduit bodies, first ports, conduits, plugs, cavities, open sides, panels, second ports, partial seals, hinge members, panel connectors, first port gaskets, second port gaskets, panel gaskets, setter screws, and other components may be disclosed, such components may comprise any shape, size, style, type, model, version, class, grade, measurement, concentration, material, weight, quantity, and/or the like consistent with the intended operation of a method and/or system implementation for a universal conduit body assembly may be used.

In places where the description above refers to particular implementations of a universal conduit body assembly, it should be readily apparent that a number of modifications may be made without departing from the spirit thereof and that these implementations may be applied to other universal conduit body assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A universal conduit body assembly, comprising:
   a body comprising a first end wall, a second end wall opposite the first end, a first port extending through the first end wall, a second port extending through said second end wall, four sides extending between the first end and the second end, each of said sides having an opening that extends more than halfway between the first end and the second end, said body having a cavity with a first panel anchor at a first corner of said first end wall and spaced inwardly from an inner edge of said opening in each of said four sides, and a second panel anchor at a second corner of said second end wall opposite said first panel anchor and spaced inwardly from the inner edge of said opening;
   each said opening in said sides having a panel removably coupled to the body to cover the respective opening, said panel having a first panel connector at a first corner of said panel extending through said opening and coupled to said first panel anchor and a second panel connector at a second corner of said panel extending through said opening and coupled to said second panel anchor;
   each said panel anchors extending between opposite sides of said body and surrounding said first port and second ports.

2. The universal conduit body assembly of claim 1, wherein each said opening extends substantially from the first end wall to the second end wall.

3. The universal conduit body assembly of claim 2, further comprising:
   a second port extending through the second end wall; and
   a third port extending through the first panel.

4. The universal conduit body assembly of claim 3, further comprising:
   a third opening on third side of the plurality of sides and equal in dimensions to the first opening; and
   a third panel positionable between an open position that uncovers the third opening and a closed position that covers the third opening, the third panel equal in length and width dimensions to the second panel.

5. The universal conduit body assembly of claim 4, further comprising a plug removably coupled to the first port.

6. The universal conduit body assembly of claim 5, further comprising three panel gaskets, each panel gasket positioned between the body and a different panel of the first, second, and third panels.

7. The universal conduit body assembly of claim 1, further comprising a third port extending through at least one of said panels.

8. The universal conduit body assembly of claim 1, further comprising a plug coupled to one of the first or the second ports.

9. The universal conduit body assembly of claim 8, further comprising:
   a panel gasket positioned between each of said panels and the body.

10. A universal conduit body assembly, comprising:
    a body comprising a first end wall, a second end wall opposite the first end wall, a first port extending through the first end wall, a plurality of sides between the first and the second end walls, a first opening on a first side of the plurality of sides that extends substantially from the first end wall to the second end wall, and a second opening equal in dimensions to the first opening on a second side of the plurality of sides, said body having an internal cavity with a plurality of panel anchors positioned within the first opening and second opening, said panel anchors extending through said cavity between opposite sides of said body and surrounding said first port and second port, said panel anchors being positioned at opposite corners of the first opening and second opening;
    a first panel positionable between an open position that uncovers the first opening and a closed position that covers the first opening, said first panel having panel connectors at opposite corners of said first panel and extending through said first opening for coupling to a respective panel anchor; and
    a second panel positionable between an open position that uncovers the second opening and a closed position that covers the second opening, the second panel equal in length and width dimensions to the first panel, said second panel having panel connectors at opposite corners of said second panel and extending through said first opening for coupling to a respective panel anchor.

11. A universal conduit assembly, comprising:
    a body comprising a first end wall, a second end wall opposite the first end wall, and a plurality of supports extending between the first end wall and the second end wall and defining an internal cavity;
    a first port extending through the first end wall;
    a first opening enclosed by the first end wall, the second end wall, and two adjacent supports of the plurality of supports;
    a panel anchor positioned in said cavity at said first end wall at a first corner of said first opening and a panel anchor positioned in said cavity at said second end wall at a second corner opposite said first opening, said panel anchors being spaced inwardly from said first opening;
    a second opening enclosed by the first end wall, the second end wall, and two adjacent supports of the plurality of supports, the second opening equal in length and width dimensions to the first opening;
    a panel anchor positioned in said cavity at a first corner at said first end wall and extending between opposite sides of said body and a panel anchor positioned in said cavity at a second corner opposite said first corner at said second end wall and extending between opposite sides of said body, said panel anchors being spaced inwardly from said second opening;
    a first panel removably coupled to the body to cover the first opening, said first panel having a plurality of panel connectors at opposite corners of said panel passing through said first opening and coupled to a respective panel anchor; and a second panel removably coupled to the body to cover the second opening, the second panel equal in length and width dimensions to the first panel, said second panel having a plurality of panel connectors at opposite corners of said panel passing through said second opening and coupled to a respective panel anchor.

12. The universal conduit assembly of claim 11, further comprising:
a second port extending through the second end wall; and
a third port extending through the second panel.

13. The universal conduit assembly of claim 12, further comprising:
a third opening enclosed by the first end wall, the second end wall, and two adjacent supports of the plurality of supports; and
a third panel removably coupled to the body to cover the third opening.

\* \* \* \* \*